Oct. 9, 1923.
R. MORSDOFF
CUTTING TOOL
Filed Dec. 6, 1921
1,469,945
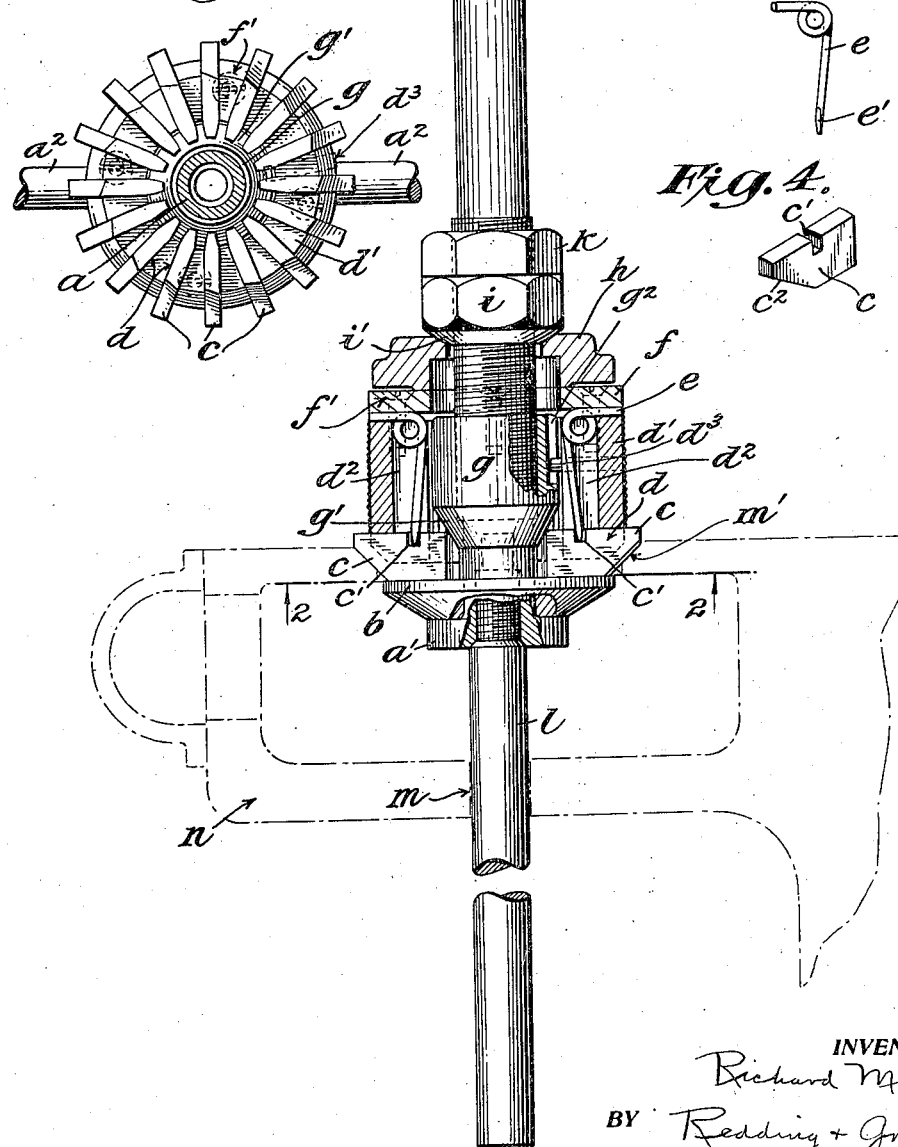
INVENTOR
Richard Morsdoff
BY Redding & Greeley
ATTORNEYS.

Patented Oct. 9, 1923.

1,469,945

UNITED STATES PATENT OFFICE.

RICHARD MORSDOFF, OF WEST HOBOKEN, NEW JERSEY.

CUTTING TOOL.

Application filed December 6, 1921. Serial No. 520,212.

*To all whom it may concern:*

Be it known that I, RICHARD MORSDOFF, a citizen of the United States, whose residence and post-office address is West Hoboken, in the State of New Jersey, have invented certain new and useful Improvements in Cutting Tools, of which the following is a specification, reference being had to the accompanying drawing, forming a part hereof.

This invention relates to cutting tools and will find its most useful application in reseating tools for valve seats. The embodiment herein has been illustrated and will be described with reference to a hand reseating tool embodying the invention, although it is to be understood that the appended claims are intended to cover the improved principles when employed for other uses in machine operated or hand operated tools.

Valve seats in internal combustion motors vary in diameter and in pitch angles. It is now the common practice in service stations to keep on hand a tool having cutters of appropriate pitch and span for cutting the valve seats of the more numerous types. In such tools the cutters are fixed permanently so that they are not adapted for use in reseating seats of different pitch angles or seats of different diameters. Further, when worn or reground they are not adapted for further use since their effective cutting span is destroyed.

The principal object of the present invention is to provide a tool for use in the situation described and in similar situations which shall be simple in construction, inexpensive and provided with a plurality of interchangeable and adjustable cutters adapting it for use, within certain limits, for reseating valve seats of different diameters and different pitch angles. More particularly, the object of the invention is to provide a tool of these characteristics in which the replacement of the cutter and their adjustment when in place may be performed quickly and with ease by a comparatively unskilled workman, all of the parts being accessible for handling.

In accordance with the invention the improved cutting tool comprises generally a plurality of removable spring-pressed cutters, a carrier therefor, a tapered nut in engagement with the cutters to fix their radial positions against the action of their springs and rotatable with the carrier but movable axially with respect thereto, a supporting shaft on which the tapered nut is threaded and means for clamping the parts in cutting position.

The invention will be described with greater particularity with reference to the accompanying drawing, in which—

Figure 1 is a view partly in elevation and partly in section of the improved cutting tool showing it in position for cutting the valve seat of a motor, a portion of the latter being indicated in dotted lines.

Figure 2 is a view in section through the tool taken on the plane indicated by the line 2—2 of Figure 1 and looking in the direction of the arrows.

Figure 3 is a detail view of a spring for one of the cutters.

Figure 4 is a view in perspective of one of the cutters.

The shaft $a$ of the cutter is formed at its lower end with a flange $a'$ on which is supported a disc $b$ on which rest the cutters $c$. These cutters may be of any number but in the preferred embodiment a relatively great number will be employed to give the most uniform and effective cutting action without chattering. The cutters are disposed radially with respect to the shaft $a$ and are located in radial slots $d$ formed in the lower face of the annular carrier $d'$. This carrier may have its outer periphery knurled to facilitate rotation thereof for a purpose which will later appear. The shaft $a$ extends through the annular carrier $d'$ and the latter has its inner wall formed with a plurality of slots $d^2$ corresponding in number and in alinement with the respective slots $d$ for the cutters $c$. In each of these slots $d^2$ is disposed a suitable spring $e$ which, in the preferred form, will be of the character illustrated in Figure 3. The lower end of each spring may be chamfered, as at $e'$, to present a flat bearing surface to the side wall of a transverse slot $c'$ cut in the upper edge of the cutter $c$ which the spring engages. The upper end of each spring $e$ extends generally at right angles to the lower end and overlies the upper surface of the carrier $d'$ and is clamped thereto by a clamping ring $f$ which may be secured removably to the carrier by screws $f'$. It will be evident as the description proceeds that the invention is not to be limited to the particular form of the springs or the means for mounting them so as to give the desired spring action on the cutters. The object is to impress on each cutter a spring action which will tend to force it inwardly towards the shaft $a$.

Within the annular carrier $d'$ and threaded on the shaft $a$ is a nut $g$, the lower end of which may be tapered, as at $g'$, for a suitable distance. The inner edge of each cutter $c$ is intended to bear against the tapered portion $g'$ when the cutter is in use, the springs $e$ serving to hold them in this relation yieldingly. On the outer periphery of the nut $g$ is provided a longitudinal slot $g^2$ with which is engaged, when the parts are properly assembled, a pin $d^3$ secured to the carrier $d'$. By this construction, rotation of the carrier $d'$ will cause rotation of the nut $g$. Since the nut is in threaded engagement with the shaft $a$ and in sliding engagement with the carrier $d'$ axial movement of the nut along the carrier will be effected by such rotation without disturbing the axial position of the carrier $d'$.

The parts may be clamped in cutting position by means of a loose cap $h$ which may rest on the binding ring $f$ and clamped thereagainst by means of a jam nut $i$ which is threaded on the shaft $a$. The lower side of the jam nut $i$ will preferably be of spherical form, as indicated at $i'$, in order that it may find an easy seat on the cap $h$ and be readily backed off therefrom. A lock nut $k$ may also be threaded on the shaft $a$ and cooperate with the nut $i$ to lock it in place in a manner well known.

When, as in the illustrated embodiment, the tool is to be used for reseating valve seats, the lower end of the shaft $a$ may be threaded interiorly for engagement by a removable guide stem $l$ which is of such diameter as to enter freely the usual valve stem hole $m$ in the valve manifold $n$ of a motor.

The uses and advantages of the improved tool will now be summarized. The user will keep on hand only one tool for each workman who is to be actively engaged in reseating valve seats. He will keep in stock several sets of cutters $c$, these cutters having their angular cutting edges $c^2$ of different pitch to conform to the usual run of valve seats as now found in internal combustion engines. When the valve seats of a motor of a certain pitch angle are to be reseated cutters having corresponding angles to their cutting edges $c^2$ will be selected. The nuts $i$ and $k$ will be backed off sufficiently to afford enough clearance between the disc $b$ and the lower ends of the various springs $e$ for the insertion into the slots $d$ of the cutters $c$. The nut $i$ will then be set up on so as to nearly clamp the cutters $c$ between the carrier $d'$ and the disc $b$. The carrier $d'$ will then be rotated so as to move the nut $g$ axially along the threads on the shaft $a$ until the taper $g'$ thereon acting on the cutters $c$ will fix them readily in such position as to give an effective cutting diameter equal to the diameter of the valve seat. The taper $g'$ will be effective in accomplishing this setting by reason of the co-operation of the springs $e$ which constantly force the cutters $c$ against the taper. As shown in the drawing the effective cutting diameter of the cutter $c$ corresponds to the diameter of the valve seat $m'$ in the valve manifold. After this adjustment is made the jam nut $i$ may be set up hard so as to clamp the cutter $c$ between the carrier $d'$ and the disc $b$. The stem $l$ will then be threaded into the lower end of the shaft $a$ and the tool passed down into cutting position, the stem $l$ entering the valve stem hole $m$ and serving as a guide for the tool. Rotation of the cutter by means of a convenient handle $a^2$ will be carried on in a manner commonly practised. If now, it is assumed that the next motor to be worked on has valve seats of a different diameter but the same pitch angle the cutter $c$ may be left in place but the nut $i$ will be backed off enough to permit free rotation of the carrier $d'$ so as to move the nut $g$ axially along the shaft $a$ and, through its taper $g'$, set the cutter $c$ to the desired effective cutting diameter. The parts will then be reclamped. If the pitch angle of the valve seat next presented is different, a different set of cutters having appropriate angles $c^2$ will be inserted in the manner heretofore described. Since the range of adjustment of the effective cutting diameter is comparatively large the cutters may be reground and used over and over again compensation for loss in metal being afforded by adjustment of the taper $g'$ with respect to the cutters.

As indicated hereinbefore, it is evident that the principle described may be embodied in cutting tools for other purposes and for tools which are to be machine operated. Further, changes in mechanical details will suggest themselves, but all such departures are to be deemed within the spirit of the invention provided they fall within the scope of the appended claims.

I claim as my invention:

1. A cutting tool comprising a carrier, a plurality of movable cutters mounted movably in the carrier and radially thereof, a shaft extending through the carrier, a tapered nut threaded on the shaft, a slot and stud connection between the carrier and the nut whereby rotation of the carrier effects axial movement of the nut with respect thereto, means to press the cutters yieldingly against the tapered nut, and means to clamp the parts in working position.

2. A cutting tool for a carrier, a plurality of cutters mounted movably in radial slots in the carrier, a shaft passing through the carrier, a plate on the shaft on which the cutters rest, springs mounted on the carrier and engaging the respective cutters to force them inwardly, a tapered nut threaded on the shaft and engaging the cutters to force them outwardly against the action of the springs, and a slot and stud connection between the carrier and the nut whereby rotation of the carrier causes axial movement of the nut.

3. A cutting tool for a carrier, a plurality of cutters mounted movably in radial slots in the carrier, a shaft passing through the carrier, a plate on the shaft on which the cutters rest, springs mounted on the carrier and engaging the respective cutters to force them inwardly, a tapered nut threaded on the shaft and engaging the cutters to force them outwardly against the action of the springs, a slot and stud connection between the carrier and the nut whereby rotation of the carrier causes axial movement of the nut, a clamping ring engaging the carrier, and a jam nut threaded on the shaft to engage the clamping ring and lock the parts in cutting position with the cutters between the carrier and the plate.

4. A cutting tool comprising an annular carrier formed with a plurality of radial slots on one end and a corresponding number of alined slots longitudinally of its inner periphery, a plurality of removable cutters mounted movably in the first named slots, a plurality of springs mounted in the second named slots and engaging the respective cutters to force them inwardly, means to secure said springs removably on the carrier, a shaft extending through the carrier, a tapered nut threaded on the shaft and engaging the cutters to determine their radial positions against the action of said springs, a slot and stud connection between the carrier and the nut whereby rotation of the carrier effects axial movement of the nut and a jam nut threaded on the shaft to clamp the parts in cutting position.

5. A cutting tool comprising an annular carrier formed with a plurality of radial slots on one end and a corresponding number of alined slots longitudinally of its inner periphery, a plurality of removable cutters mounted movably in the first named slots, a plurality of springs mounted in the second named slots and engaging the respective cutters to force them inwardly, means to secure said springs removably on the carrier, a shaft extending through the carrier, a tapered nut threaded on the shaft and engaging the cutters to determine their radial positions against the action of said springs, a slot and stud connection between the carrier and the nut whereby rotation of the carrier effects axial movement of the nut, a plate on the shaft on which the cutters rest, and a jam nut to clamp the parts in cutting position with the cutters clamped between the carrier and the plate.

6. A cutting tool comprising a carrier, a plurality of cutters mounted movably in radial slots in the carrier, a shaft passing through the carrier, a plate on the shaft on which the cutters rest, springs mounted on the carrier and engaging the respective cutters to force them inwardly, a tapered nut threaded on the shaft and engaging the cutters to force them outwardly against the action of the springs, a slot and stud connection between the carrier and the nut whereby rotation of the carrier causes axial movement of the nut, a clamping ring engaging the carrier, a jam nut threaded on the shaft to engage the clamping ring and lock the parts in cutting position with the cutters between the carrier and the plate, and a guide stem threaded in the lower end of the shaft to extend through the valve stem opening of a motor.

This specification signed this 30th day of November, A. D. 1921.

RICHARD MORSDOFF.